(No Model.)

H. A. BLANCHARD.
SPOOL CASE.

No. 276,344. Patented Apr. 24, 1883.

WITNESSES:
Harry L. Ashenfelter
James F. Tobin

INVENTOR:
Helen A. Blanchard
by her Attorneys
Howson and Son

N. PETERS, Photo-Lithographer, Washington, D. C.

UNITED STATES PATENT OFFICE.

HELEN A. BLANCHARD, OF PHILADELPHIA, PENNSYLVANIA.

SPOOL-CASE.

SPECIFICATION forming part of Letters Patent No. 276,344, dated April 24, 1883.

Application filed March 19, 1883. (No model.)

*To all whom it may concern:*

Be it known that I, HELEN A. BLANCHARD, a citizen of the United States, and a resident of Philadelphia, Pennsylvania, have invented an Improved Spool-Case, of which the following is a specification.

The object of my invention is to provide a cheap and convenient cover or case for spools of silk, cotton, thread, &c., whereby the contents of the spool are kept clean and prevented from being accidentally unwound, and the spool is ready for immediate delivery to a purchaser without further wrapping.

Figure 1:
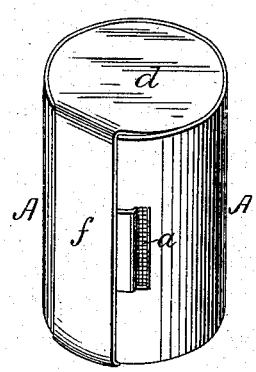
Figure 2:
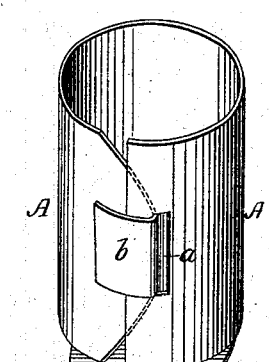
Figure 3:
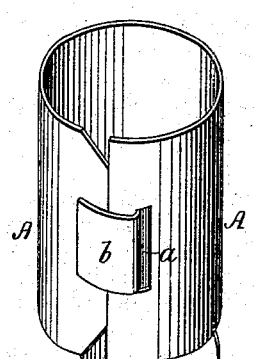

In the accompanying drawings, Figure 1 is a view of a spool with my improved cover or envelope in its preferred form; Fig. 2, a detached view of the cover, and Figs. 3, 4, 5, 6, and 7 views showing modified forms of the cover or envelope.

In Figs. 1 and 2 the cover shown comprises the strip A and projection B. The strip A is of proper size to envelop the body of the spool, and near one edge of said strip is formed a slot, *a*, the opposite edge of the strip forming a tongue, *b*, adapted to the slot, so that when the strip A is bent around the spool its ends may be interlocked, as shown in Fig. 2, and the spool thereby inclosed. The projection B is formed on one edge of the strip A, and comprises the end covers, *d d*, the connecting-strip *f*, and the tongue *g*. After the strip A has been folded around the spool and its ends interlocked, as shown in Fig. 2, the projection B is brought around, as shown in Fig. 1, so that the portions *d d* cover the ends of the spool, and the strip *f* covers and protects the interlocked joint of the strip A, the parts being retained in this position by tucking the tongue *g* in between the head of the spool and the strip A. The color of the contents of the spool can be seen through the slot *a*, so that the spool need not be uncovered for this purpose, and the end of the thread can be drawn through the slot *a*, to permit the unwinding of the thread from the spool without removing the cover. The contents of the spool are thus protected from injury or deterioration due to handling, not only when the spool is in use, but also during transportation or when on sale, and the spool, when provided with the improved envelope, is in condition for delivery to the purchaser without further wrapping. Accidental unwinding of the thread from the spool is also prevented by the cover, and when a number of spools are placed together in a work-basket or other receptacle the entangling of the threads is prevented.

The covers are inexpensive, as they can be readily cut in large quantities from flat sheets of paper by a suitable die.

Figure 4:
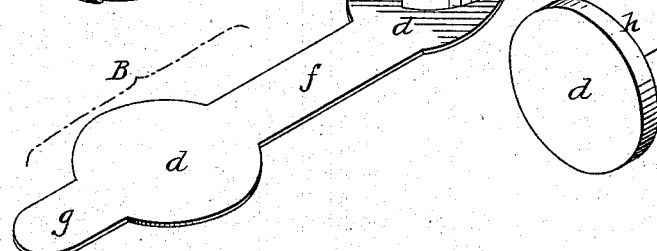
Figure 4:
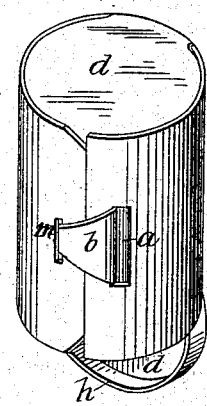
Figure 5:
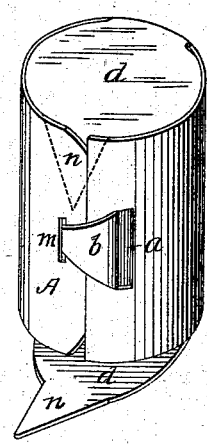
Figure 6:
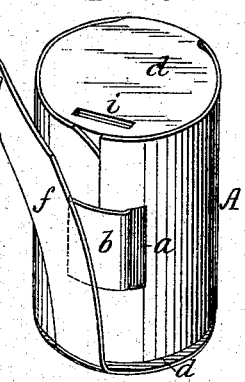
Figure 7:
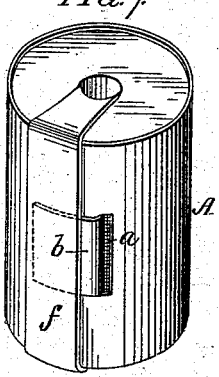

While I prefer the form of cover shown in Figs. 1 and 2, the same is not absolutely necessary to the carrying out of my invention. For instance, in Figs. 3, 4, 5, 6, and 7, I have shown other forms of spool-coverings in which the essential features of my invention are embodied. The cover, Fig. 3, has a cap, *d*, with a rim, *h*, in place of the tongue *g*, this rimmed cap being adapted to fit over the end of the spool and its inclosing-strip A. In Fig. 4 both end caps are made with rims, which are applied to the heads of the spool before the strip A is closed around the same. In this case, also, the end of the tongue *b* of the strip A is retained by tucking it into a slot, *m*, in the strip, instead of by a covering-strip, *f*. In Fig. 5 the end caps have tongues *n* instead of rims, and the opposite ends of the strip A are secured in the same manner as in Fig. 4. In Fig. 6 the retaining-strip *f* is used, and said strip has at the end a tongue, *g*, which is adapted to a slot, *i*, in one of the end caps *d*. In Fig. 7 the strip *f* is separate from the strip A and the end caps are dispensed with, the ends of the strip *f* being retained by tucking them into the central opening of the spool.

The cover furnishes a ready and convenient means of displaying any trade-marks or advertisements which the manufacturer or dealer may desire to apply to the goods, the surface of the strip A, as well as the ends *d*, being available for this purpose. The cover may, if desired, be made of a size sufficient to contain two or more spools instead of a single spool, as shown.

I claim as my invention—

1. A spool case or cover consisting of a strip, A, having at one end a tongue and at the other end a slot for the reception of said tongue and the exposure of the thread, as set forth.

2. A spool case or cover consisting of a strip, A, having ends constructed so as to interlock, and a strip, f, adapted to cover and protect the joint thus formed, as specified.

3. A spool case or cover comprising the strip A, with interlocking ends, the end caps, d, and strip f, as set forth.

In testimony whereof I have signed my name to this specification in the presence of two subscribing witnesses.

HELEN A. BLANCHARD.

Witnesses:
 HARRY L. ASHENFELTER,
 HARRY SMITH.